(12) United States Patent
Boccotti

(10) Patent No.: US 6,450,732 B1
(45) Date of Patent: Sep. 17, 2002

(54) CAISSON FOR ABSORBING WAVE ENERGY

(76) Inventor: Paolo Boccotti, Facoltá di Ingegneria, via Graziella 1, Loc.Feo di Vito, I - 89100 Reggio Calabria (IT)

( * ) Notice: Subject to any disclaimer, the term of this patent is extended or adjusted under 35 U.S.C. 154(b) by 0 days.

(21) Appl. No.: 09/831,312

(22) PCT Filed: Nov. 10, 1999

(86) PCT No.: PCT/IT99/00361

§ 371 (c)(1),
(2), (4) Date: May 8, 2001

(87) PCT Pub. No.: WO00/28151

PCT Pub. Date: May 18, 2000

(30) Foreign Application Priority Data

Nov. 11, 1998 (IT) .......................................... RC98A0008

(51) Int. Cl.[7] ............................. F02B 9/08; F03B 13/14
(52) U.S. Cl. ............................... 405/76; 405/8; 290/42; 290/53
(58) Field of Search ................................. 405/8, 75, 76, 405/77, 78, 79; 60/398; 290/42, 53

(56) References Cited

U.S. PATENT DOCUMENTS

| | | | | |
|---|---|---|---|---|
| 480,127 A | * | 8/1892 | O'rourke | 405/8 |
| 2,580,017 A | * | 12/1951 | Goodman | 405/8 |
| 3,391,903 A | * | 7/1968 | Peterson, Jr. | 405/76 |
| 4,321,475 A | * | 3/1982 | Grub | 60/398 |
| 4,345,433 A | * | 8/1982 | Stanwick | 60/398 |

FOREIGN PATENT DOCUMENTS

| | | |
|---|---|---|
| GB | 2 005 358 | 4/1979 |
| GB | 1 572 086 | 7/1980 |
| WO | WO 98/41758 | 9/1998 |

* cited by examiner

Primary Examiner—Heather Shackelford
Assistant Examiner—Frederick L. Lagman
(74) Attorney, Agent, or Firm—Young & Thompson

(57) ABSTRACT

A caisson (1) provided with at least one air pocket (5), and at least one vertical duct or conduit (2) extending transversally along the whole portion of the caisson (1) where the respective air pocket (5) is present. The lower portion of the caisson (1) is filled with water (6), and the vertical duct (2) extends upwards, and communicates with the outside without reaching the sea surface. The height of the air pocket (5), starting from the ceiling of the caisson (1) towards its base, being adjusted so as to obtain the resonance condition, in which the period of the detected pressure fluctuations, at the upper opening (3) of the vertical duct (2), is equal to the period of detected pressure fluctuations of the air pocket (5). Inside the vertical duct (2) turbines may be installed in order to obtain energy conversion.

4 Claims, 3 Drawing Sheets

CAISSON FOR ABSORBING WAVE ENERGY

TECHNICAL FIELD

The present invention relates to a caisson for converting the sea wave motion into a form which is more suited for conversion.

A caisson like that of the present invention, may be used for the construction of a plant, comprising one or more caissons, said plant having the structure of a caisson breakwater and being suited to be built in a dry dock, and hence towed and sunk.

BACKGROUND ART

The resonance effect for the absorption of wave energy has been exploited only for solid floating bodies, and no device exists at present which exploits the resonance of a water mass.

Moreover, the traditional absorbers require a substantially continuous regulation, which is performed at intervals of only a few seconds, and this circumstance noticeably complicates the operation of wave energy absorption devices. An object of the present invention is to realize a device in the form of a caisson used to convert the energy of sea waves into hydraulic energy which can be directly exploited, and wherein the adjustment of operative conditions of the caisson can occur at intervals of about ten to twenty minutes, depending on the variation of the "sea state" (a substantially stationary wave condition). Since the sea state has a duration of at least ten to twenty minutes, the adjustment will be performed at variable intervals of ten to twenty minutes.

A specific object of the present invention is that of realizing a caisson, or a plant comprising several caissons, which is capable or absorbing a high share of the wave energy passing above it, by producing very high pressure fluctuations inside it, and also high current speeds. The amplitude of the pressure fluctuations inside the caisson can exceed, by an order of magnitude, the corresponding amplitude of the surface waves.

Finally, a further object of the present invention is the use of special turbines with vertical axis, allowing the conversion into mechanical rotational energy, of the portion of wave energy which has been already converted into a suitable form by means of the caisson of the present invention.

DISCLOSURE OF INVENTION

The objects of the invention are obtained by means of a caisson, which is characterized in that it comprises internally at least an air pocket, and at least a vertical duct which extends transversally along the whole portion of the caisson where the air pocket is present, and wherein the lower portion of the caisson is filled with water, and the vertical duct extends upwardly* passing through the upper wall of the caisson and communicates with the outside of the caisson, without reaching with its upper aperture the sea surface, whereas at the lower end it does not reach the base of the caisson, defining at this location a lower aperture; the height of the air pocket, from the ceiling of the caisson, toward$ its base, being adjusted through air feeding and air discharge means to the outside, thereby obtaining the resonance condition in which the period of pressure fluctuations at the upper aperture of the vertical duct, or at a point below the sea surface, but located outside the caisson, is equal to the period of pressure fluctuations of the air pocket or to the period of pressure fluctuations at any point located inside the caisson.

Particular embodiments of the present invention are defined in the dependent claims.

BRIEF DESCRIPTION OF DRAWINGS

The present invention will now be described for illustrative and non limitative purposes, with reference to the drawings, in which.

BEST WAY OF CARRYING OUT THE INVENTION

Figure 1:
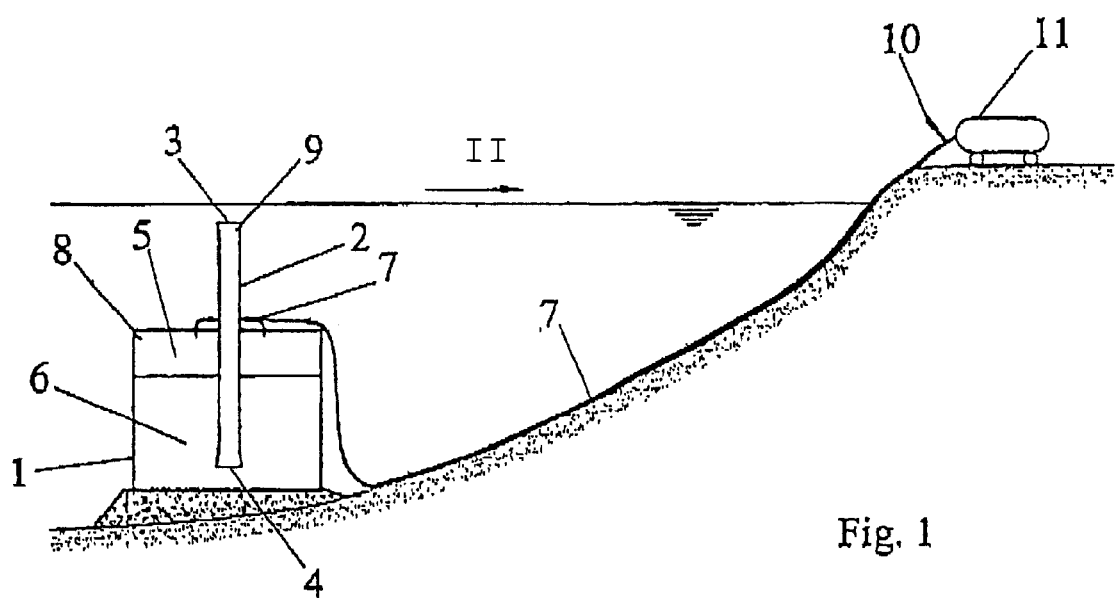
FIG. 1 is a schematical cross-sectional view along the plane I—I of FIG. 2, showing a caisson of the present invention and the general principle of the latter.
Figure 2:
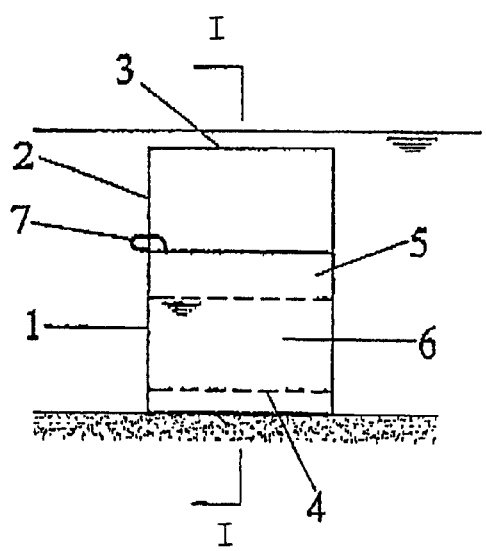
FIG. 2 is a schematical front view showing the principle of operation of the caisson according to the invention, the view being taken in the direction of the arrow II of FIG. 1, that is from the open sea side.
Figure 3:
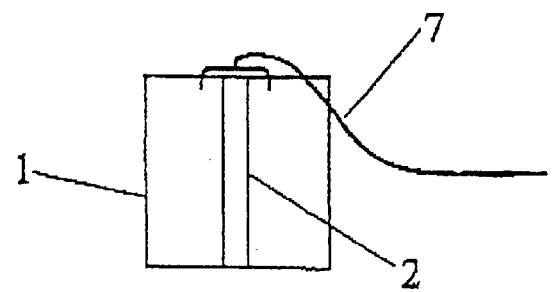
FIG. 3 is a schematical plan view of the caisson according to the invention shown in FIGS. 1 and 2, and illustrating the general principle thereof.

Referring to FIGS. 1 to 3, the principle of operation of the caisson according to the invention will be described first. The caisson 1 has walls made of reinforced concrete, and is completely closed. It is laid on the sea bottom and is in communication with the outside only through the vertical duct or conduit 2. The upper opening 3, however, is located beneath the sea surface. The lower opening (aperture) 4 is inside the caisson 1, above its base. As may be seen in FIGS. 2 and 3, and by comparison with FIG. 1, the side of the opening 3, which is normal to the dominant wave direction (arrow II), has a length which is equal to that of the side of the caisson.

The upper wall or roof of the caisson 1 is connected with a compressor 11, placed on land (as in FIG. 1) or on an offshore platform (not shown). Downstream of the air compressor 11 there is gate valve or tap 10, Air is pumped in the caisson 1 by means of the compressor 11 and the air passage tube (or hose) 7, thereby forming an air pocket 5 on the water mass 6 located inside the caisson 1. The object is to reach the resonance condition. The period T, of pressure fluctuations, detected in real time, on the upper aperture 3 of the vertical duct or conduit 2 (or at a point located externally and beneath the sea surface), is compared with the period $T_i$ of pressure fluctuations detected in real time—, in the air pocket 5 (or at any point inside the caisson). If $T_e$ exceeds $T_i$, air has to be pumped inside the caisson, until $T_e=T_i$ (resonance condition). On the other hand, if $T_e$ is less than $T_i$, the gate valve 10 must be opened and air removed from the air pocket 5 until $T_e=T_i$.

For the "pressure fluctuation period" we may choose either the peak period of the spectrum of the aforesaid pressure fluctuations, or alternatively, a characteristic period of the highest pressure fluctuations for that particular sea state, e.g. the period $T_{1/3}$ defined as the average period of the highest one-third of all the pressure fluctuations of a sea state.

It is important that the same definition be taken for both $T_e$ and $T_i$.

The adjustment of the air amount must be performed for every (new) sea state. Given that a sea state (nearly stationary wave condition) has a duration of at least ten or twenty minutes, the regulation must be effected at variable intervals ranging from ten to twenty minutes.

This plant may absorb a high share of the wave energy passing above it, and may produce very high pressure fluctuations inside the caisson, and high current (flow) speeds inside the vertical conduit 2. The amplitude of the pressure fluctuations inside the caisson 1 may exceed, by an order of magnitude, the very amplitude of the surface waves. Reference numbers 9 and 8 denote pressure transducers for the detection of pressure fluctuations at the site of the opening 3 of the duct 2 and the air pressure fluctuations inside the air pocket 5, respectively.

Summing up, the plant—which may also comprise a caisson breakwater formed by a plurality of caissons 1—, is capable of absorbing a high proportion of the wave energy and to transform it into a form most suitable for conversion. A possible way for converting the energy obtained in this manner, is to employ the Wells turbines, with vertical axes, mounted inside the vertical duct 2, as may be seen from the following illustrative embodiment referring to FIGS. 4 to 6.

EXAMPLE

Figure 4:
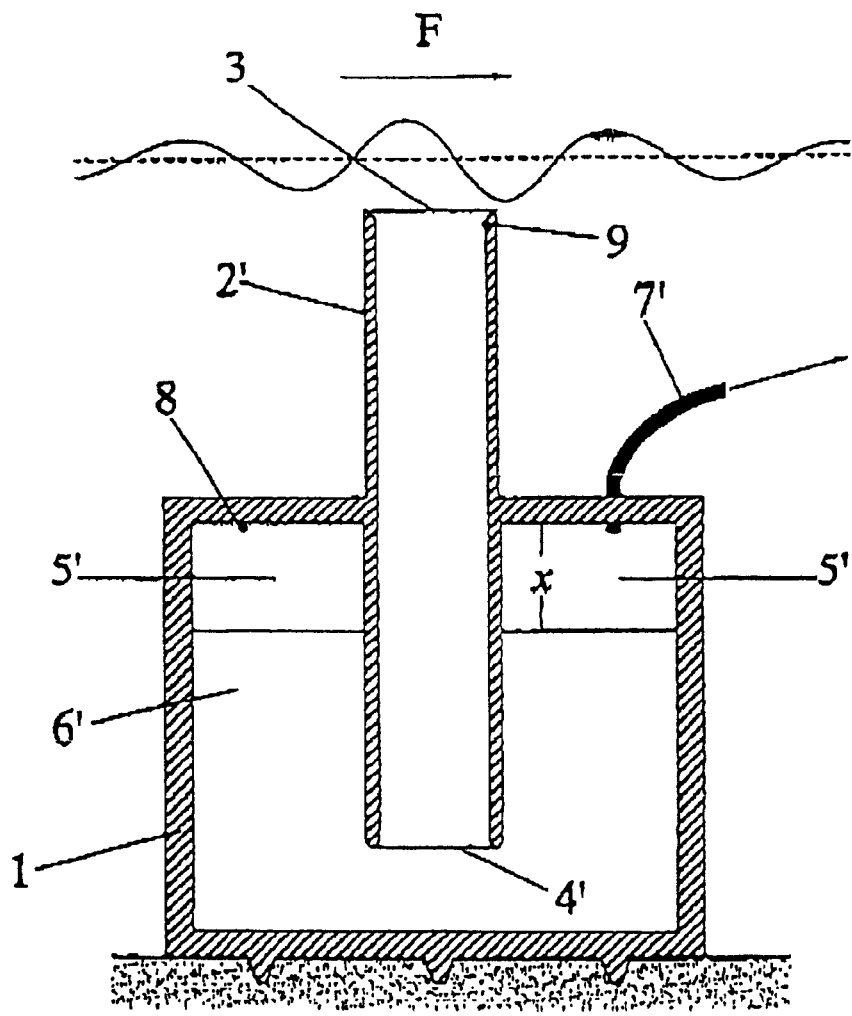
FIG. 4 is a sectional view of a possible embodiment of the invention, taken along the plane IV—IV of FIG. 6.
Figure 5:
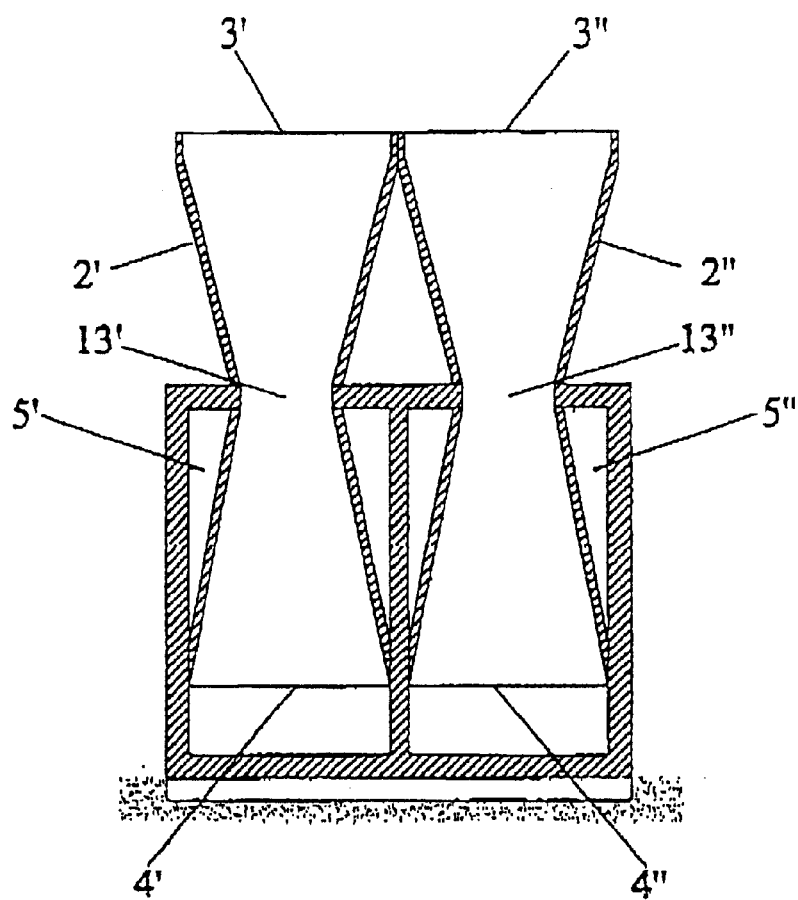
FIG. 5 is a sectional view of the caisson of FIG. 4, according to line V—V of FIG. 6.
Figure 6:
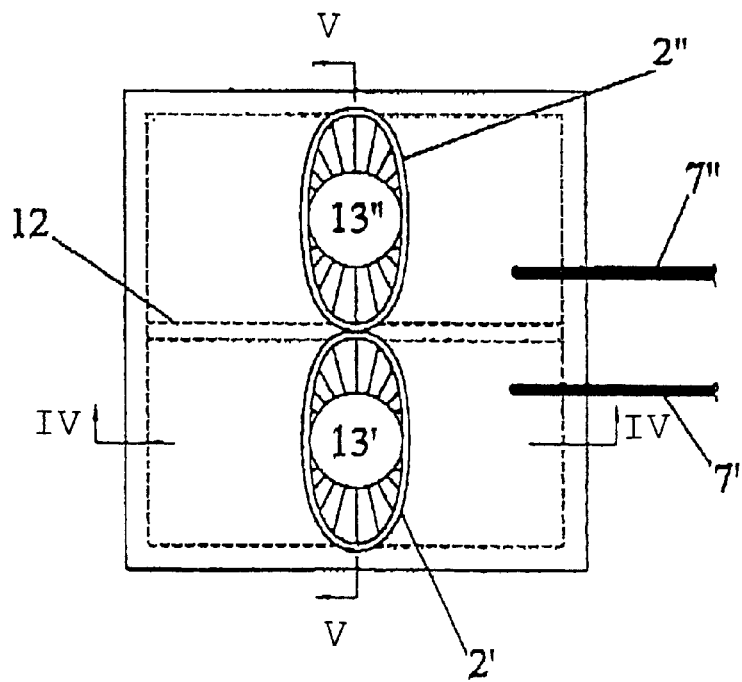
FIG. 6 is a plan view of the caisson of the present invention, in the embodiment shown in the foregoing FIGS. 4 and 5.

FIGS. 4 to 6 illustrate an. embodiment in which the caisson 1 is subdivided by a septum (separation wall) 12. The hoses 7',7" feed air into the air pockets 5', 51" on both sides of the septum 12. on each side of the septum 12 there is arranged a duct or conduit 2', 2" having a smallest section region 13',13". The prototype shown will be placed off the Ligurian coast (Mediterranean Sea). Such a system is able to absorb 50% of the wave energy passing above it in a year.

This prototype has the following dimensions (only illustrative and non limitative):

- 28 meters from the base of the caisson 1 to the top of the conduit 2' or 2" (openings 3', 3");
- square section caisson with sides of 20 meters (see FIG. 6);
- height of the caisson equal to 17 meters (excluding the ducts 2' and 2");
- diameter of the smallest circular section 13' or 13" equal to 4 meters.

It is assumed that it is simply laid on the sea bottom at 30 meters from the sea surface.

With wind waves of 2.5 meters of $H_s$ (the significant wave height, by definition equal to four times the standard deviation of the free surface displacement during a sea state), the amplitude x during resonance will be about 2.2 meters. With such an air pocket, the velocity of the current inside the conduits 2', 2", will attain 3.5 meters/second, and the maximum discharge will be 90 m³/second.

Moreover, the significant wave height of the pressure head waves inside the caisson attains the value of about 20 meters (that is, nearly eight times the significant, wave height of the surface waves!).

The prototype has been designed to convert the absorbed wave energy by means of two turbines of Wells, These turbines, with vertical axes, are mounted in the smallest circular sections 13', 13" of the vertical ducts 2', 2".

The maintenance of the plant is rather simple. Indeed, if we pump in a large amount of air, the caisson 1 will float, and this occurs before the air of the air pockets 5', 5" reaches the lower opening 4", 4" of the respective vertical ducts 2', 2".

Under sea storms with $H_s$ exceeding 6 meters, the air is totally removed from the caisson 1, so as to enhance the safety of the structure against sliding between the caisson and the sea bottom.

This means that energy absorption and conversion is interrupted under significant wave heights exceeding 6 m. However, the share of the wave energy associated to values of $H_s$ greater than 6 meters, is only about 2%, on average, of the whole wave energy approaching the Ligurian coast.

What is claimed is:

1. A caisson on a sea bed for absorbing wave energy, comprising:

at least one internal air pocket;

at least one vertical duct or conduit extending transversally along a whole portion of the caisson where the respective air pocket is present, wherein a lower portion of the caisson is filled with water, wherein the vertical duct extends upwards passing through a roof or upper wall of the caisson and communicates with the sea without an upper opening of said vertical duct reaching a surface of the sea and wherein said vertical duct extends downward without reaching a base of the caisson, where said vertical duct defines a lower opening;

a height of the air pocket, starting from the roof of the caisson towards said base, being adjusted through means for feeding air to the air pocket or discharging air to the outside, so as to obtain a resonance condition in which a period of pressure fluctuations at the upper opening of the vertical duct is equal to a period of pressure fluctuations of the air pocket.

2. The caisson according to claim 1, further comprising means for energy conversion that is mounted in the vertical duct.

3. The caisson according to claim 2, wherein the vertical duct has a smallest section in which said means for converting energy is installed.

4. The caisson according to claim 1, wherein said means for feeding or discharging air comprise at least one compressor mounted on land or on an offshore platform, at least a valve, and at least one tube or hose for establishing a connection with the roof of the caisson for feeding air to the air pocket, or to discharge air to the outside, until the resonance condition is obtained.

\* \* \* \* \*